US010184754B2

(12) United States Patent
Laemmlen (10) Patent No.: US 10,184,754 B2
(45) Date of Patent: *Jan. 22, 2019

(54) UTILITY CARRIER DEVICE

(71) Applicant: StealthGearUSA LLC, American Fork, UT (US)

(72) Inventor: Paul Laemmlen, Cedar Hills, UT (US)

(73) Assignee: StealthGearUSA LLC, Lindon, UT (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/254,941

(22) Filed: Sep. 1, 2016

(65) Prior Publication Data

US 2016/0370144 A1 Dec. 22, 2016

Related U.S. Application Data

(63) Continuation-in-part of application No. 14/741,310, filed on Jun. 16, 2015, now Pat. No. 9,829,276.

(51) Int. Cl.
*F41C 33/04* (2006.01)
*A45F 5/02* (2006.01)
*H04B 1/3888* (2015.01)

(52) U.S. Cl.
CPC .............. *F41C 33/041* (2013.01); *A45F 5/02* (2013.01); *A45F 5/021* (2013.01); *A45F 2200/0508* (2013.01); *A45F 2200/0516* (2013.01); *A45F 2200/0575* (2013.01); *H04B 1/3888* (2013.01)

(58) Field of Classification Search
CPC .................... F41C 33/02; F41C 33/041; A45F 2200/0591; Y10S 224/911–224/912
See application file for complete search history.

(56) References Cited

U.S. PATENT DOCUMENTS

| 7,314,152 | B1 | 1/2008 | Garrett |
|---|---|---|---|
| 2005/0184115 | A1 | 8/2005 | Wells |
| 2014/0027486 | A1 | 1/2014 | McGee et al. |
| 2014/0158733 | A1 | 6/2014 | McDonnell |
| 2015/0034683 | A1 | 2/2015 | Tedder |
| 2015/0034684 | A1 | 2/2015 | Tedder |
| 2015/0115005 | A1 | 4/2015 | Slinkard |
| 2016/0102940 | A1 | 4/2016 | Sykes et al. |

OTHER PUBLICATIONS

International Search Report and Written Opinion dated Sep. 9, 2016 for PCT Patent application No. PCT/US2016/037445.
Notice of Allowance dated Oct. 3, 2016 for Design U.S. Appl. No. 29/527,881.
Office Action dated Sep. 23, 2016 for U.S. Appl. No. 14/741,310.
Notice of Allowance dated Aug. 23, 2017 for U.S. Appl. No. 14/741,310.

*Primary Examiner* — Corey Skurdal
(74) *Attorney, Agent, or Firm* — The Mueller Law Office, P.C.

(57) ABSTRACT

A utility carrier device has a first shell, a backing and a first wing. The first shell is shaped to cover a part of a first item to be secured. The backing is secured to the first shell, thereby forming a first pocket between the first shell and the backing. The first pocket is configured to secure the first item to the utility carrier device. The first wing is attached to and extends from a first end of the first shell. A first spacer is positioned between the first wing and the first end of the first shell, the first spacer having a flexible or compressible material that allows the first wing to flex relative to the first shell.

19 Claims, 11 Drawing Sheets

UTILITY CARRIER DEVICE

CROSS-REFERENCE TO RELATED APPLICATIONS

This application is a continuation-in-part of U.S. patent application Ser. No. 14/741,310, filed on Jun. 16, 2015 and entitled "Weapon Holster Device," which is incorporated by reference herein in its entirety.

TECHNICAL FIELD

The subject matter described herein relates to a holster or carrier device that can secure a weapon, magazine or other item and conform to a body part or article of clothing.

BACKGROUND

Weapon holsters can be configured to hold various types of weapons, such as guns. In addition, weapon holsters can protect and restrict movement of the weapons and can be secured to various parts of the body and/or articles of clothing. Some people who carry weapons in weapon holsters want to do so inconspicuously, such as undercover police officers. As such, these people also want weapon holsters that not only safely carry a weapon, but also effectively conceal them.

SUMMARY

In embodiments, a utility carrier device has a first shell, a backing and a first wing. The first shell is shaped to cover a part of a first item to be secured. The backing is secured to the first shell, thereby forming a first pocket between the first shell and the backing. The first pocket is configured to secure the first item to the utility carrier device. The first wing is attached to and extends from a first end of the first shell. A first spacer is positioned between the first wing and the first end of the first shell, the first spacer having a flexible or compressible material that allows the first wing to flex relative to the first shell.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter is directed to a holster device that can secure a weapon, such as a gun, to a body part or article of clothing. In addition, the holster device can conform to or contour (i.e., fit closely to) the body part or article of clothing the holster device is secured to. The holster device disclosed herein can allow a user to safely, securely, and inconspicuously carry a weapon. For example, the ability of the holster device to conform to a body part or clothing of a user can allow the user to carry the weapon in the holster device in a concealed manner. This can prevent others from knowing that the user is carrying the weapon. The ability of the holster device to contour or conform to an adjacent body part or clothing of a user can also improve the comfort and effectiveness of the holster device (e.g., the user's ability to safely and efficiently withdraw the weapon).

FIGS. 1-7 illustrate an implementation of a holster device 100 that includes a shell 102 coupled to a backing 104. The shell 102 can be shaped to cover a part of a first side of a weapon, such as a gun. The backing 104 can be shaped to cover a part of a second side of the weapon. The shell 102 and backing 104 can be coupled together to form a pocket 106 therebetween. For example, the shell 102, backing 104, and pocket 106 can be configured to safely secure a gun within the pocket 106.

Figure 1:
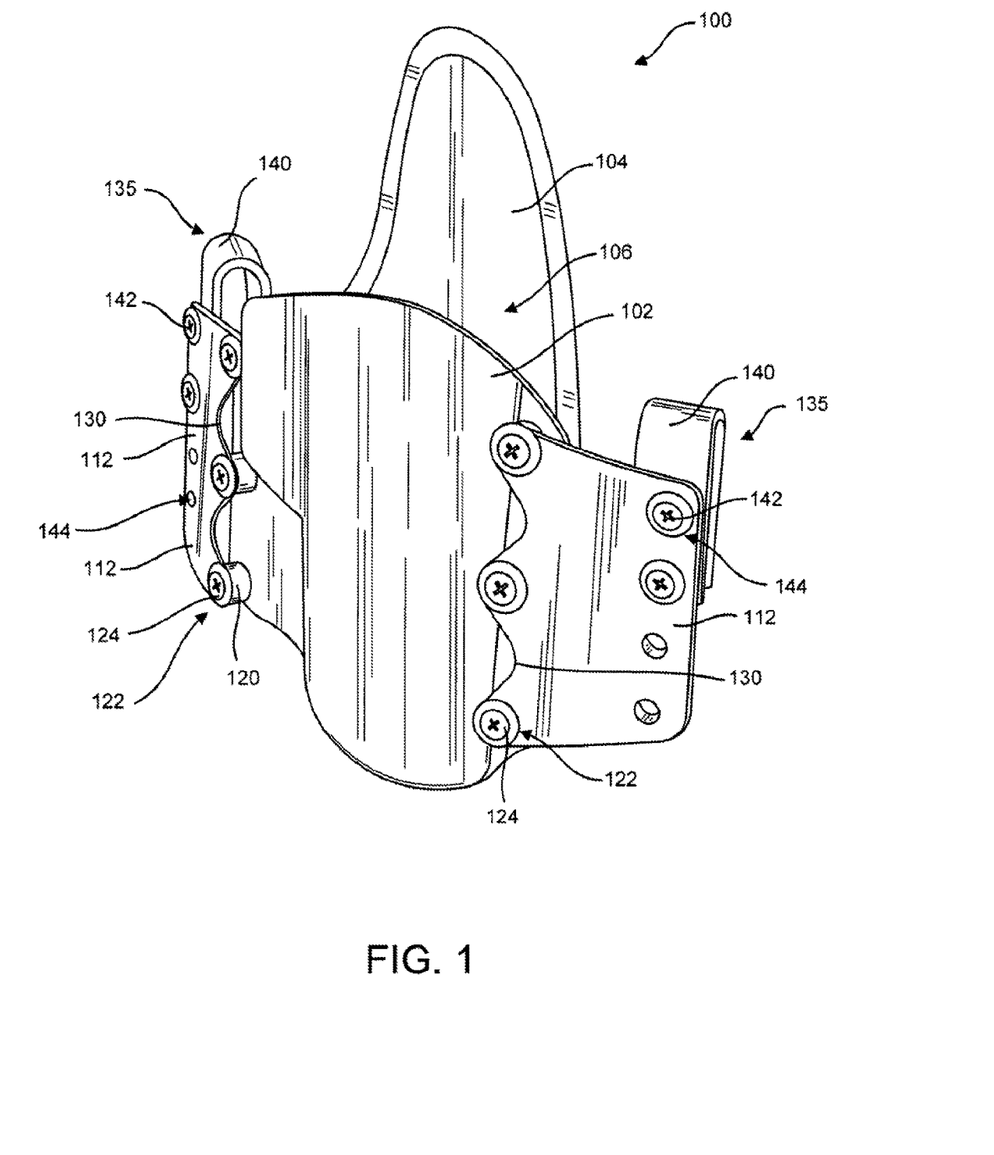
FIG. 1 shows a perspective view of an implementation of a holster device consistent with implementations of the current subject matter.
Figure 2:
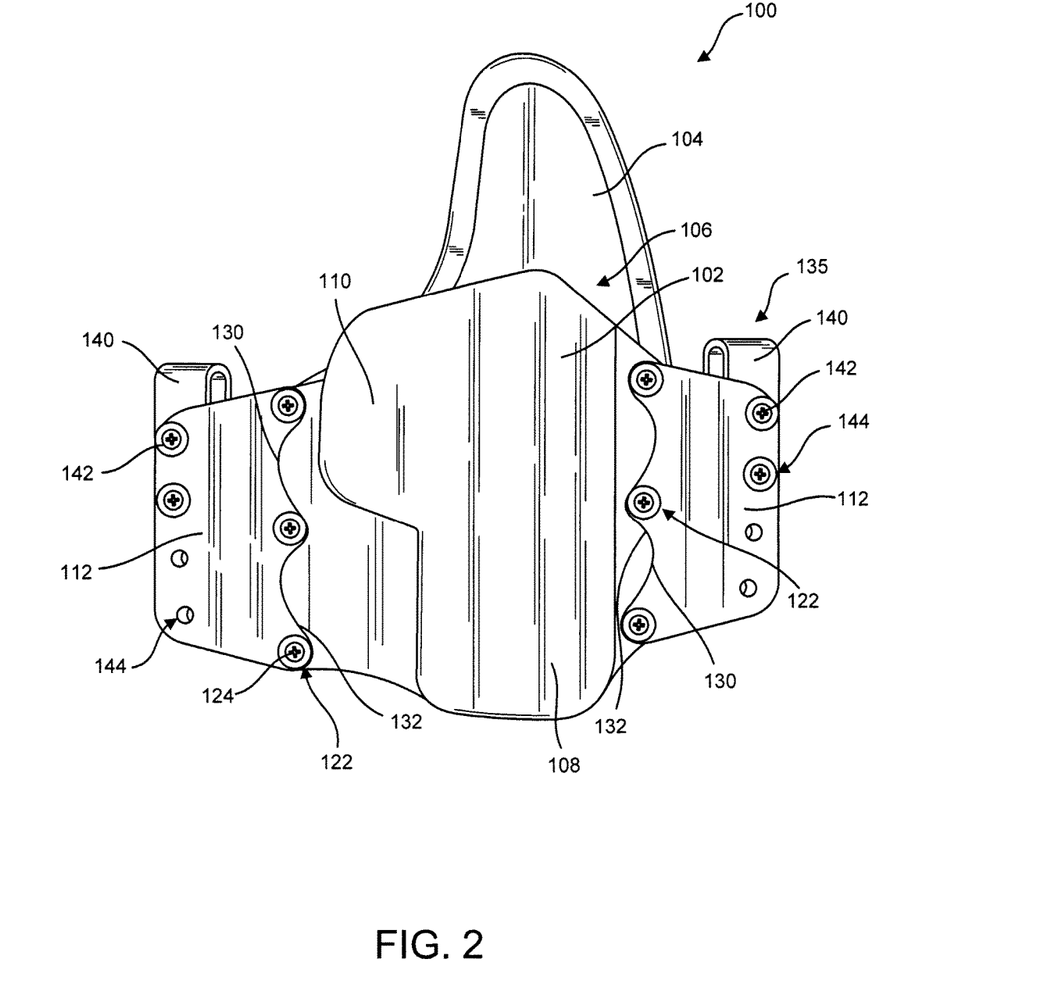
FIG. 2 shows a front view of the holster device of FIG. 1.

The shell 102 can be made out of a rigid material and can be shaped to conform to at least a part of a gun. For example, the shell 102 can include one or more indentations and/or features that are consistent with a shape of the gun, which can assist with securing the gun within the pocket 106. For example, the shell 102 can include a stepped-down feature or indentation that pushes the weapon toward the user's body when the weapon is secured within the pocket 106. As shown in FIGS. 1-2, for example, the shell 102 can include a barrel conforming section 108, which can be sized and shaped to conform to a barrel of the gun. In addition, the shell 102 can include a trigger conforming section 110, which can be sized and shaped to conform to a part of the gun that includes the trigger.

The conforming aspects of the shell 102 (e.g., trigger conforming section 110 and barrel conforming section 108) can assist with securing and stabilizing the gun within the pocket 106 as well as pushing the gun towards the user's body, which can assist in concealing the gun. In addition, the conforming aspects of the shell 102 can also assist with reducing an overall bulk of the holster device 100, which can also assist in concealing the weapon or gun. The shell 102 can have a variety of shapes and sizes, including having features that allow for fast weapon drawing from the holster device 100. For example, the shell 102 can include a notch or cutout that exposes a part of the weapon when the weapon is secured in the pocket 106. Any number of features can be included for assisting with increasing the speed at which the weapon can be drawn from the holster device 100. In addition, the shell 102 can be made out of a variety of materials, including a variety of light weight and rigid materials. For example, the shell 102 can be made out of Kydex, ballistic nylon, and/or leather. However, the shell 102 can be made out of other materials without departing from the scope of this disclosure.

In addition to the shell 102 conforming to a weapon, the holster device 100 can conform to a body part of the user and/or an article of clothing associated with the user. This can also assist with concealing the weapon as well as improving comfort and effectiveness associated with carrying the weapon. The ability of the holster device 100 to conform to the user will be described in greater detail below.

Figure 6:
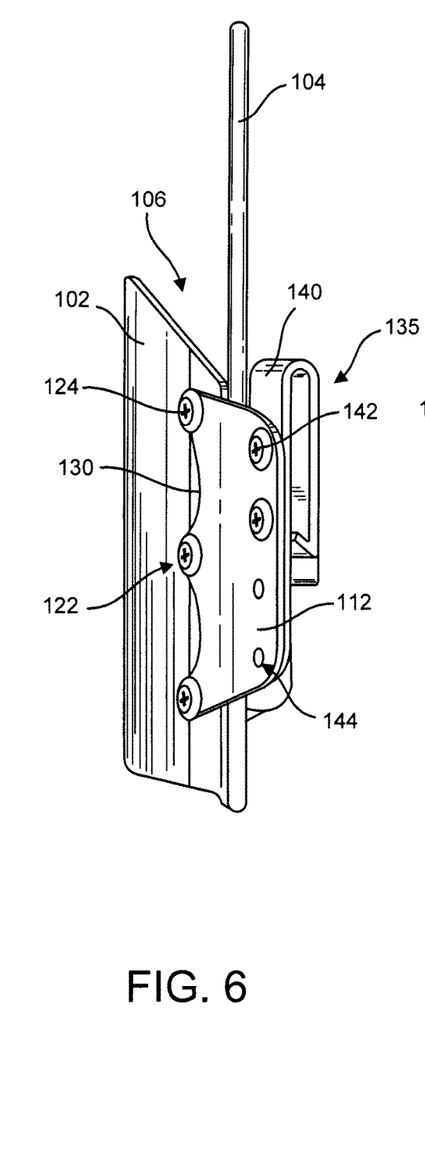
FIG. 6 shows a first side view of the holster device of FIG. 1.
Figure 7:
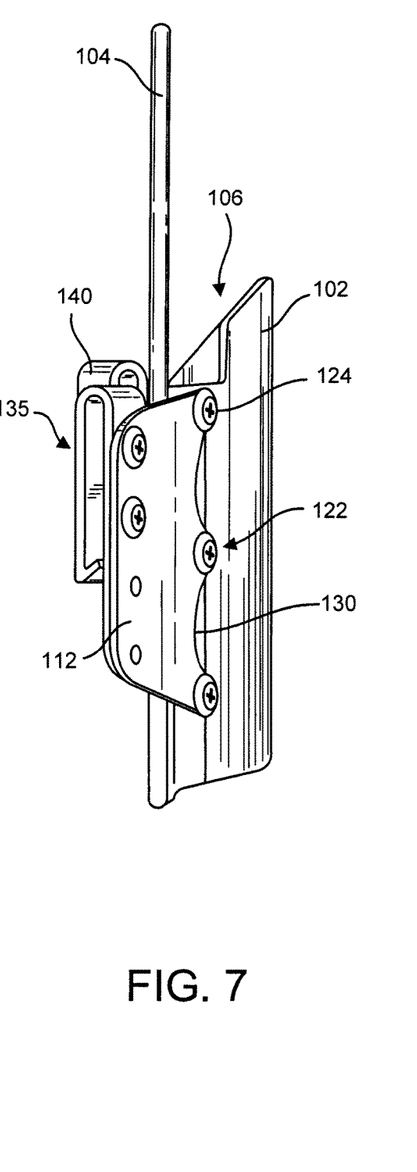
FIG. 7 shows a second side view of the holster device of FIG. 1.

For example, the holster device 100 can also include one or more wings 112 attached to the shell 102, such as a pair of wings 112 secured to opposing sides of the shell 102, as shown in FIGS. 1-2. The wings 112 can be sized and shaped to assist with allowing the holster device 100 to conform to the body part and/or article of clothing to which the holster device 100 is attached. For example, the wings 112 can be bent or angled such that they extend in a back direction (i.e., towards the body part and/or article of clothing to which the holster device is attached), as shown in FIGS. 6-7.

Figure 4:
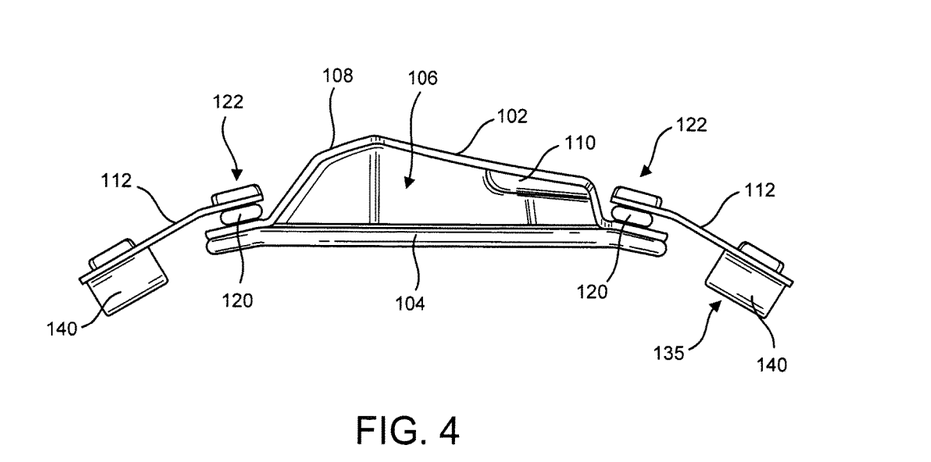
FIG. 4 shows a top view of the holster device of FIG. 1.
Figure 5:
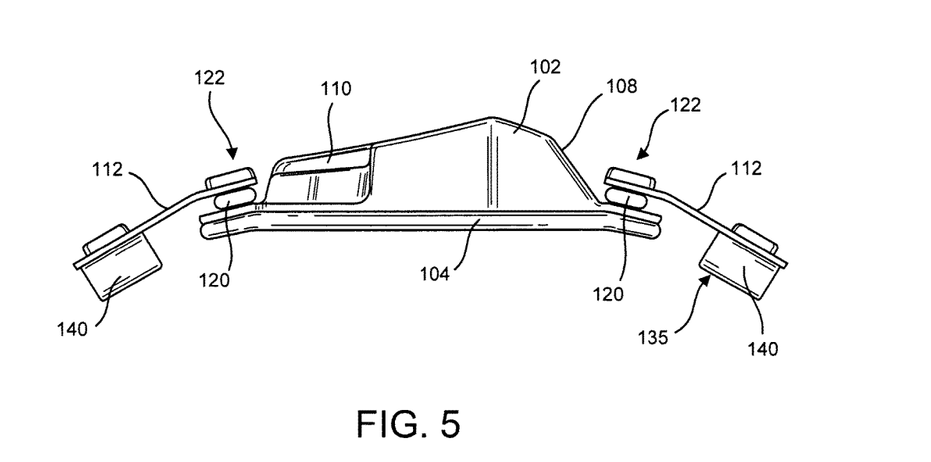
FIG. 5 shows a bottom view of the holster device of FIG. 1.

In addition, the holster device 100 can include one or more spacers 120 positioned between a wing 112 and the shell 102, as shown in FIG. 4-5. The spacers 120 can be made out of a flexible and/or compressible material that can allow the wing 112 adjacent the spacer 120 to flex relative to the shell 102. For example, the wing 112 can flex or bend towards the back direction, which can assist the holster device 100 with conforming to the body part and/or article of clothing to which the holster device 100 is attached. The spacers 120 can allow for improved flexibility and movement of the holster device 100, which can allow the holster device 100 to conform to a variety of shapes and sizes, such as a variety of body parts having a variety of circumferences (e.g., a leg, abdomen, arm, etc.). In addition, the flexibility and/or compressibility of the spacers 120 can allow the wings 112 to flex relative to the shell 102 in response to movement of the user, while still allowing the holster device 100 to remain secured to the user.

The size and shape of the spacers 120 can vary. For example, in some implementations, the spacers 120 can be substantially circular or oval in shape. In addition, the number of spacers 120 a holster device 100 includes can vary. For example, in some implementations, every attachment point 122 that connects the wing 112 to the shell 102 can include a spacer 120.

Figure 3:
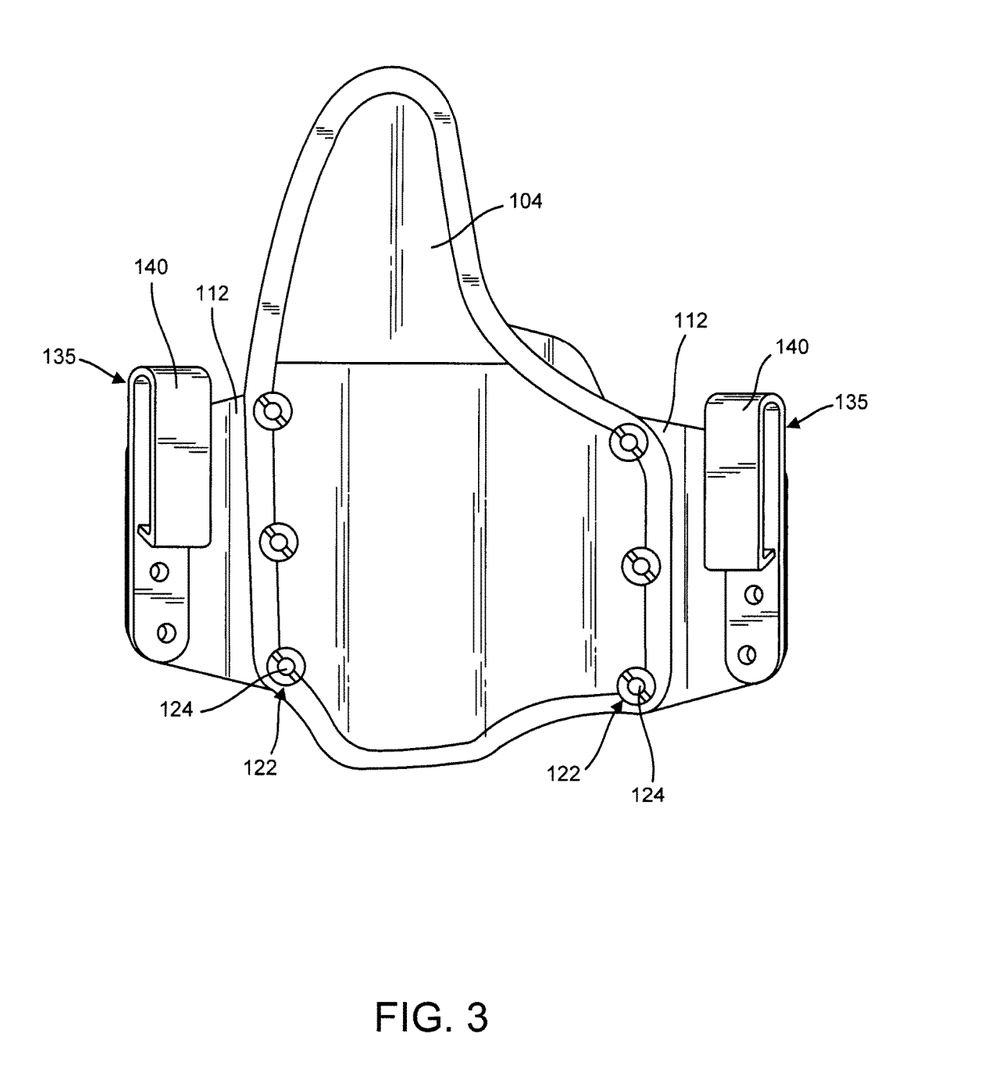
FIG. 3 shows a back view of the holster device of FIG. 1.

As shown in FIGS. 1-3, the attachment points 122 can include an attachment feature 124 (e.g., a rivet, a barrel nut and screw, etc.) that secures the wing 112, spacer 120, and shell 102 together. More specifically, the attachment feature 124 can secure the spacer 120 between the shell 102 and the wing 112. Although the spacer 120 is described as being separate from the attachment feature 124, the spacer 120 can include features that secure the wing 112 to the shell 102 such that an attachment feature is not needed. Furthermore, the attachment feature 124 (or spacer 120) can additionally secure the backing 104 to the shell 102. The attachment points 122 can also include attachment holes that allow the attachment feature 124 to extend therethrough. In addition, the attachment holes can be slotted in order to allow for additional flex of the wing 112 relative to the shell 102.

Figure 9:
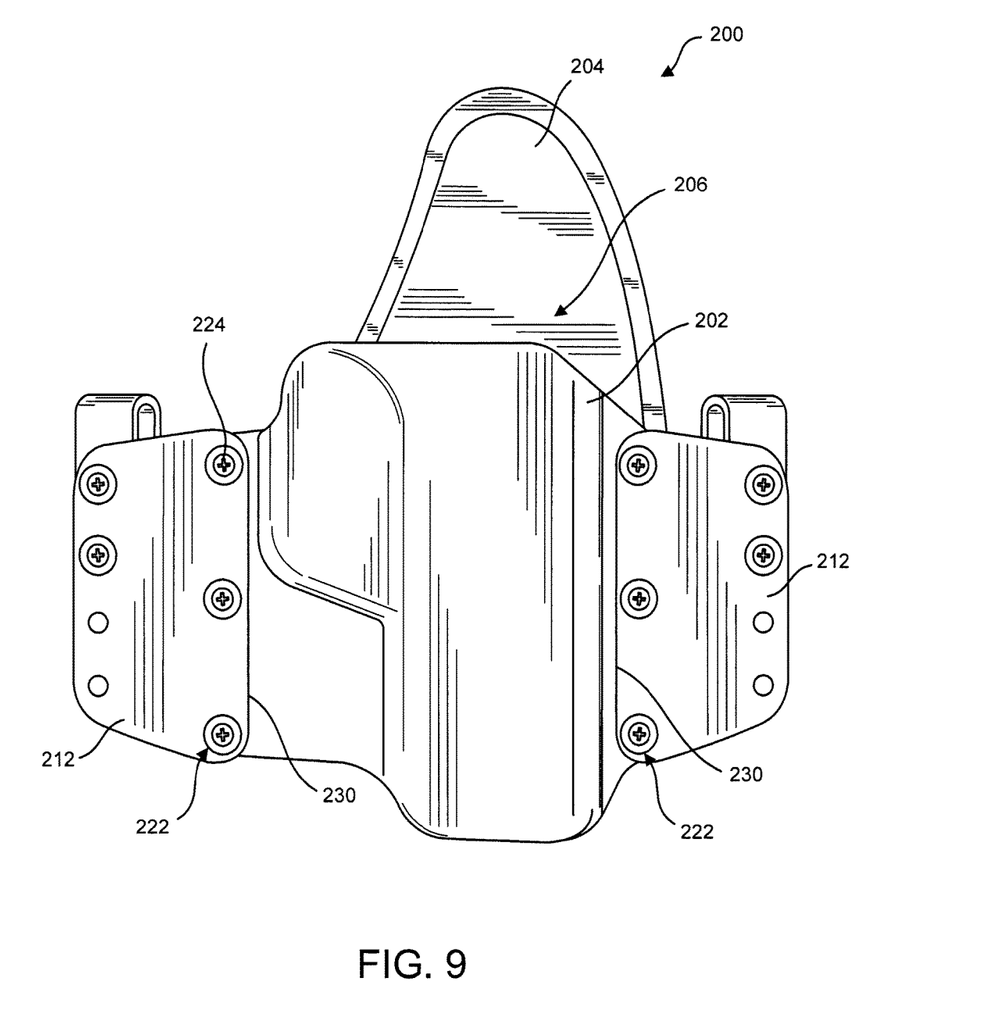
FIG. 9 shows a front view of the holster device of FIG. 8.

Although the holster device is shown and described herein as including two wings 112, the holster device 100 can include one or more wings 112 without departing from the scope of this disclosure. In addition, each wing 112 can have a variety of shapes and sizes. For example, the holster device 100 can include a first wing that has the same size and/or shape as a second wing. However, in some implementations, the first wing can have a different size and/or shape as the second wing. The first wing and second wing can also be positioned in a variety of ways relative to each other and the shell 102. For example, the first wing can be symmetrical with the second wing (as shown in FIG. 9), which can include a first top edge of the first wing aligning with a second top edge of the second wing. However, in some implementations, the first wing can be offset from the second sing (as shown in FIG. 2), which can include the top edge of the first wing being out of alignment with the second top edge of the second wing. In addition, the first and second wing can be made out of the same or different materials. Additionally, a wing 112 can be made out of either a flexible or rigid material.

As shown in FIG. 2, the wings 112 can include a coupling side 130 that can include one or more features that assist with allowing the wings 112 to flex relative to the shell 102. For example, the coupling side 130 can include one or more extensions 132, as shown in FIG. 2. In addition, the extensions 132 can include a location for the attachment point 122. As such, a spacer 120 can be positioned between an extension 132 of the wing 112 and the shell 102.

In some implementations, the holster device 100 can include a holster attachment feature 135, such as a clip 140. The holster attachment feature 135 can assist with securing the holster device 100 to a user, such as to an article of clothing or accessory associated with the user. For example, the clip 140 can releasably couple to a part of a belt or pants thereby releasably securing the holster device 100 to the part of the belt or pants. As shown in FIGS. 2-3, the clip 140 can be secured to a wing 112 of the holster device 100 using one or more clip attachment features 142. In addition, the wing 112 can include one or more clip attachment points 144 that allow the clip attachment feature 142 to securely attach the clip 140 to the wing 112. For example, the clip attachment points 144 of a wing 112 can allow a user to customize the position of the clip 140 relative to the wing 112, such as in order to adjust the height or angle of the weapon secured in the holster device 100 relative to where the holster device 100 is secured. Although the holster device 100 is shown as including a clip 140, any number of securing features for securing the holster device 100 to either a part of a body or article of clothing is within the scope of this disclosure.

In some implementations, the backing 104 of the holster device 100 can assist with securing the weapon within the pocket 106. The backing 104 can be shaped to extend a length along a side of the weapon that is secured within the pocket 106. The backing 104 have a variety of shapes and sizes, including a backing that does not extend the length of a weapon secured within the pocket 106. In addition, the backing 104 can be made out of a variety of materials and can include a variety of features, such as foam-padding and breathable material, which can provide added comfort for a user that is wearing the holster device 100. In some implementations, the backing 104 can be secured to the shell and extend a length such that it can provide a shield between the user wearing the holster device 100 and an entire upper portion of the weapon being secured in the pocket 106 of the holster device 100.

Figure 8:
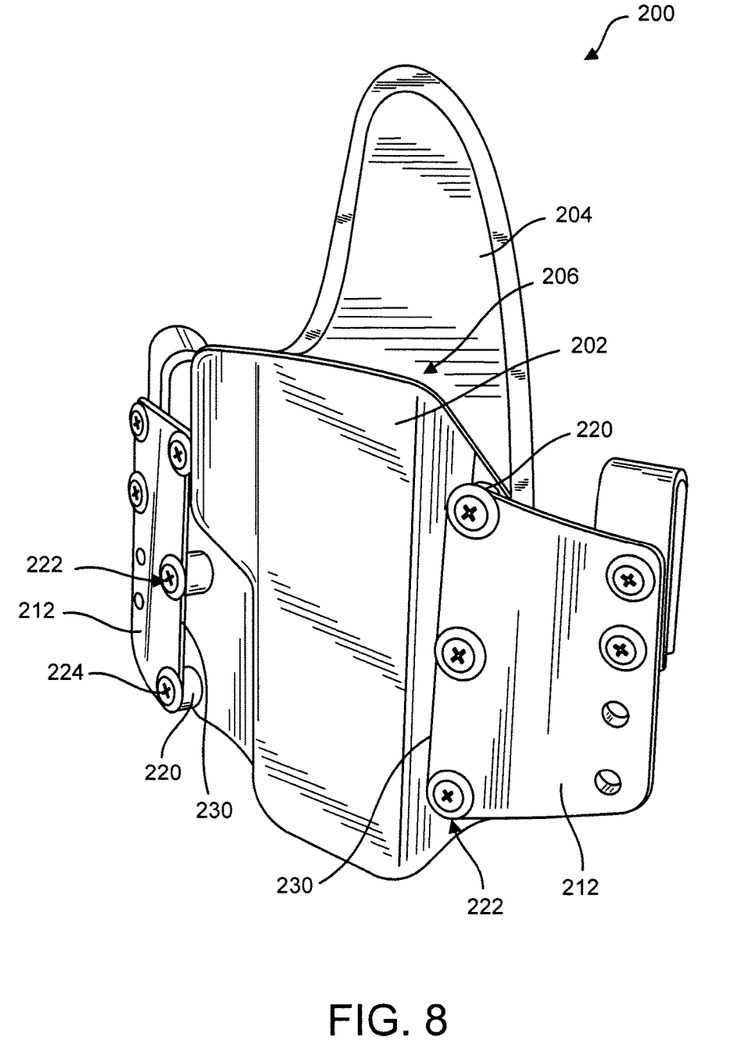
FIG. 8 shows a perspective view of another implementation of a holster device.

FIGS. 8-9 illustrate another implementation of the holster device 200, which can include a pair of symmetrical wings 212 that are coupled to opposing sides of a shell 202. In addition, the wings 212 can be aligned with each other such that the top sides of the wings are aligned. Additionally, the wings 212 of the holster device 200 can include a coupling side 230 that does not include features and, instead, is substantially flat or square. One or more attachment points 222 can be positioned adjacent the coupling side 230 and spacers 220 can be secured between the wing 212 and shell 202 at each attachment point 222, such as with an attachment feature 224. As discussed above, the spacers 220 can allow the wings 212 to flex relative to the shell 202, which can allow the holster device 200 to move and conform relative to a part of a user's body and/or article of clothing, which can improve concealment and comfort of the holster device 200.

Figure 10:
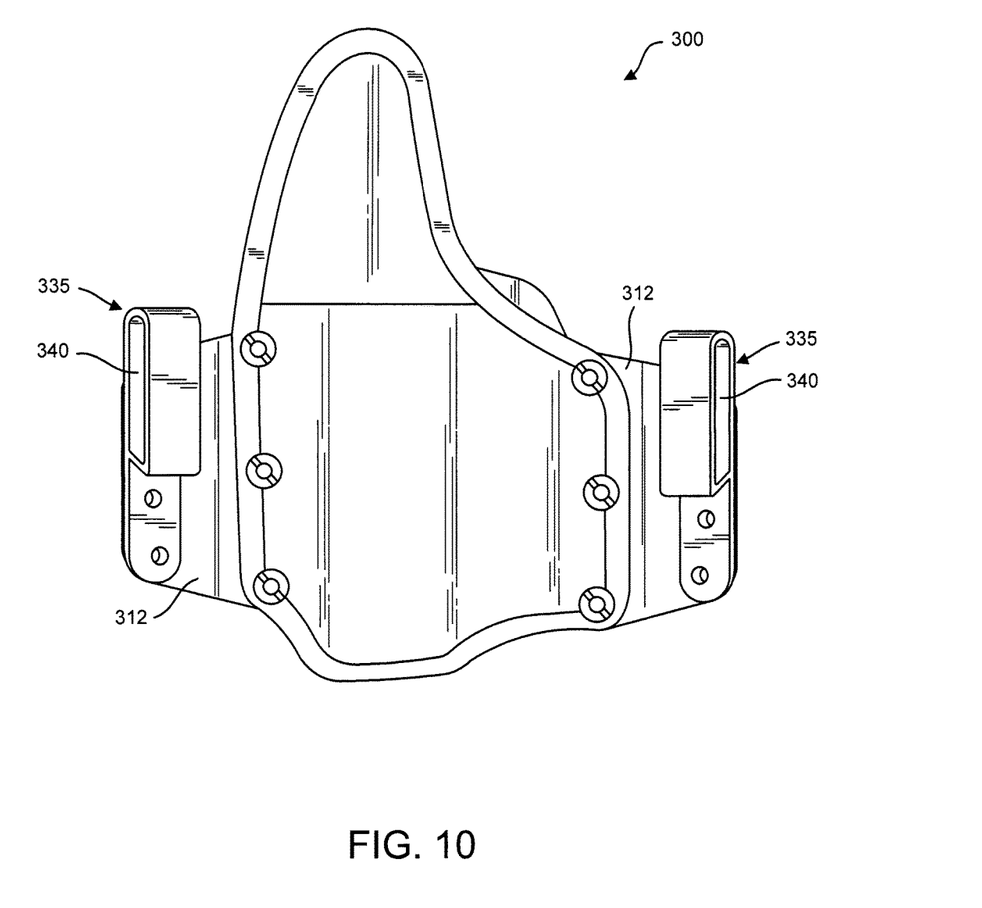
FIG. 10 shows a back view of another implementation of a holster device, which includes attachment features having a closed loop.

FIG. 10 shows a back view of another implementation of a holster device 300 that includes another implementation of a holster attachment feature 335 coupled to a wing 312 of the holster device 300. As shown in FIG. 10, the holster attachment feature 335 can include a closed loop 340 which can be sized and shaped to allow a belt (or other accessory) to extend therethrough, which can assist with securing the holster device 300 to a user. For example, a belt can be extended through the closed loops 340 that are secured to the wings 312 of the holster device 300. The belt can then be tightened and secured to the user, which can thereby secure the holster device 300 to the user. The closed loop 340 can include any of a variety of shapes and sizes, such as, for example, having one or more of a square shape, quadrilateral shape, circular shape, or oval shape. The closed loop 340 can also have a variety of thicknesses and features for effectively securing the closed loop 340, and thus the holster device 300, to a user.

Figure 11:
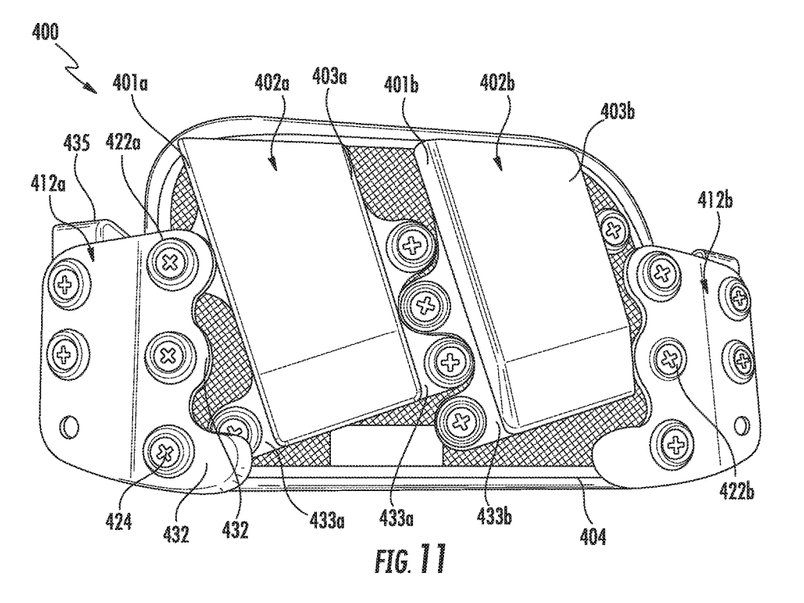
FIG. 11 shows a front view of a utility carrier device in accordance with some embodiments.
Figure 12:
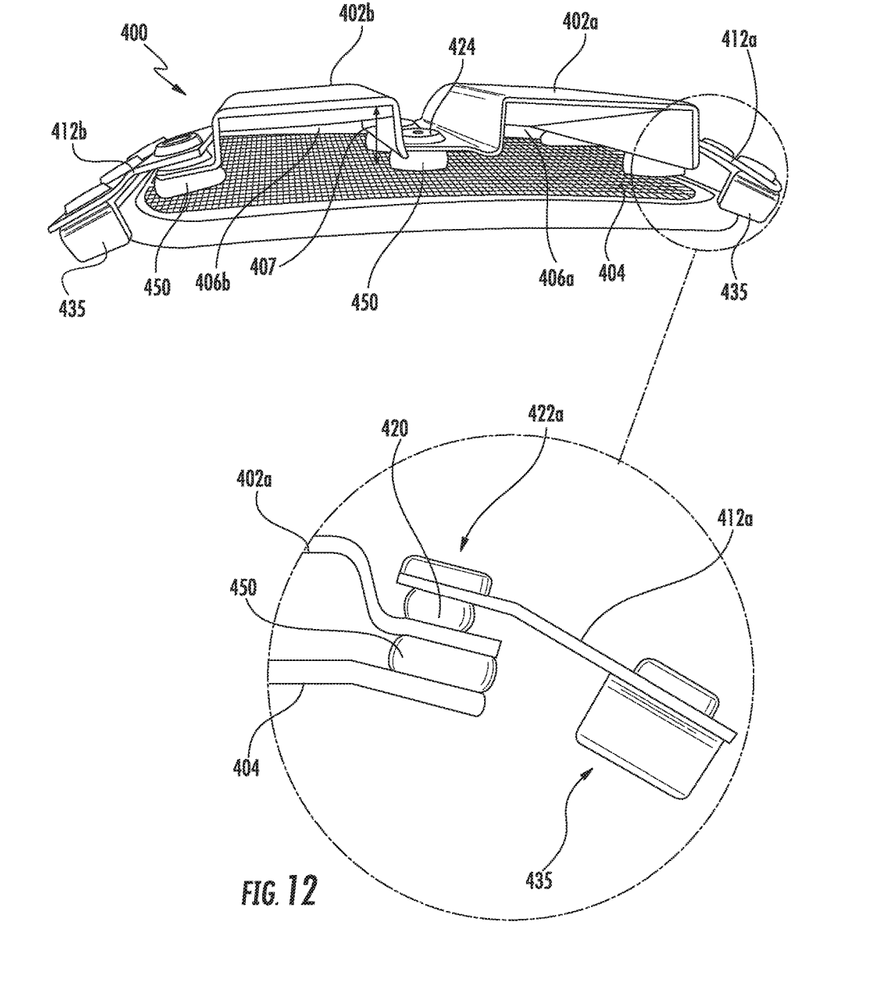
FIG. 12 shows a top end view of the utility carrier device of FIG. 11.

FIGS. 11-12 show a front view and a top view, respectively, of an embodiment of a utility carrier device 400 that can be used to secure various items besides a weapon that a user wishes to carry. Utility carrier device 400 includes shell 402a and shell 402b coupled to a backing 404. The shells 402a and 402b can be shaped to cover a part of or all of an item to be carried by a user, such as an ammunition magazine, a flashlight, a set of handcuffs, a phone, a radio, a pepper spray canister, or any other item to be secured in the utility carrier device 400. The shells 402a/b can be made out of a variety of materials, including a variety of light weight and rigid materials. For example, the shells 402a/b can be made out of Kydex, ballistic nylon, and/or leather. In other embodiments, the shells 402a/b can be made out of other materials without departing from the scope of this disclosure. Although two shells 402a and 402b are shown, in some embodiments more than two shells may be included. In other embodiments, only one shell may be utilized. In a one-shell embodiment (not shown), first wing 412a would attach to and extend from first end 401a of first shell 402a, and second wing 412b would attach to and extend from second end 403a of first shell 402a, where first end 401a and second end 403a are on opposite sides of first shell 402a.

The backing 404 can be shaped to cover a part of a back side of the item that is to be secured. The backing 404 can be made out of a variety of materials and can include a variety of features, such as a padded material and/or a breathable material, which can provide added comfort for a user that is wearing the holster device 100. As can be seen in FIG. 12, shell 402a and backing 404 can be coupled together to form a pocket 406a therebetween. Similarly, shell 402b and backing 404 can be coupled together to form a pocket 406b therebetween. First pocket 406a and second pocket 406b are used to carry items securely. For example, the shells 402a/402b, backing 404, and pockets 406a/406b can be configured to safely secure an ammunition magazine within each pocket 406a/b. In some embodiments, the backing 404 can be embedded with a moisture shield in the areas where the shells 402a/b are located. Such a moisture shield can prevent sweat and condensation from permeating the backing 404, which could damage the items being carried such as ammunition. A moisture shield can also improve comfort for the user.

The utility carrier device 400 can conform to a body part of the user and/or an article of clothing associated with the user. As in previous embodiments, the utility carrier device 400 can include one or more wings. In the embodiment of FIGS. 11-12, first wing 412a is attached to and extends from first end 401a of first shell 402a. Second wing 412b is attached to and extends from a second end 403b of shell 402b. In other embodiments, only one wing or more than two wings may be used. In some embodiments, the wings 412a and 412b may be made of a rigid material. The wings 412a and 412b can be sized and shaped to assist with allowing the utility carrier device 400 to conform to the body part and/or article of clothing to which the utility carrier device 400 is attached. For example, the wings 412a and 412b can be bent or angled such that they extend in a back direction (i.e., towards the body part and/or article of clothing to which the utility carrier device 400 is attached). Utility carrier device 400 can also include a holster attachment feature 435 (FIG. 12) for securing the device 400 to a body part of a user, or to an article of clothing or accessory associated with the user. Holster attachment feature 435 may be, for example, a clip or a closed loop. Holster attachment feature 435 may be releasably secured to the wings 412a/b such that a position of the holster attachment feature 435 relative to the first wing 412a is adjustable.

In addition, the utility carrier device 400 can include one or more spacers 420 positioned between the wings and shells, similar to spacers 120 of previous embodiments. For example, as shown in FIG. 12, spacer 420 is between wing 412a and shell 402a at attachment point 422a. A similar spacer (not visible in FIG. 12) is between wing 412b and shell 402b at attachment point 422b. The spacers 420 can be made out of a flexible and/or compressible material that can allow the wings 412a/b adjacent the spacers 420 to flex relative to the shells 402a/b. The flexibility or compressibility of the spacer material can be chosen based on the application. For instance, the spacers 420 may have a durometer of 50-70 Shore A for an inside the waistband (IWB) device, or a durometer of 30-45 Shore A for an outside the waistband (OWB) device. An example of a material in the higher durometer range is ethylene propylene diene monomer (EPDM), while an example of a lower durometer material is Neoprene. In other embodiments, the material properties for, as an example, a leg or arm carrier device may require other levels of hardness.

Attachment features 424 (e.g., a rivet, a barrel nut and screw, a bracket, a clip, etc.) are used to secure the backing 404, wings 412a/b, spacers 420, and shells 402a/b together. More specifically, an attachment feature 424 can secure a spacer 420 between the shell 402a/b and the wing 412a/b. Although the spacer 420 is described as being separate from the attachment feature 424, the spacer 420 can include features that secure the wing 412a/b to the shell 402a/b such that an attachment feature is not needed. Furthermore, the attachment feature 424 (or spacer 420) can additionally secure the backing 404 to the shell 402*a/b*. The attachment points 422*a* and 422*b* can also include attachment holes that allow the attachment feature 424 to extend therethrough. In addition, the attachment holes can be slotted in order to allow for additional flex of the wings 412*a/b* relative to the shells 402*a/b*.

The utility carrier device 400 can also include backing spacers 450 that allow adjustability in securing an item. As seen in FIG. 12, backing spacers 450 are positioned between the shells 402*a/b* and the backing 404. The backing spacers 450 are made of a compressible material that allows a dimension of the pockets 406*a* and 406*b* to be adjusted. For example, the attachment feature 424 can be tightened or loosened to adjustably compress the backing spacer 450, thereby adjusting a depth 407 of the pockets 406*a/b*. The backing spacers 450 may have a durometer of, for example, 30-40 Shore A, such as Neoprene. The thickness of the backing spacers 450 may also be chosen to customize the range of adjustment for the dimension of pockets 406*a/b*.

Figure 13:
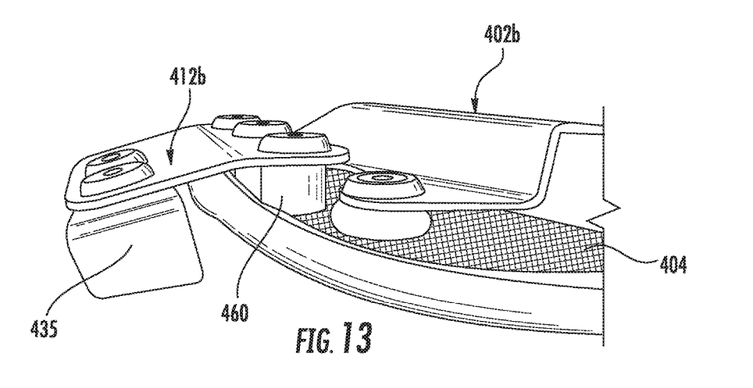
FIG. 13 shows a close-up top view of one end of the utility carrier device of FIG. 11.

FIG. 13 shows an additional mounting spacer 460 that may be included in the utility carrier device 400. Spacer 460 is positioned between backing 404 and wing 412*b*, at an attachment location where wing 412*b* is directly coupled to backing 404, without shell 402*b* sandwiched between them. Thus, spacer 460 is thicker (increased in height) compared to spacers 420 that are used between the shells 402*a/b* and wings 412*a/b*. Spacer 460 serves to provide wing 412*b* at a level position with respect to backing 404 when wing 412*b* is mounted on utility carrier device 400. Spacer 460 may be made of a flexible or compressible material similar to spacers 420 and backing spacers 450.

Returning to FIG. 11, the shells 402*a/b* and wings 412*a/b* can also include extensions to facilitate attachment of the components to the backing 404. Extensions 432 of wings 412*a/b* are similar to extensions 132 of previous embodiments, and provide surface area for the attachment features 424. Shells 402*a* and 402*b* also include extensions 433*a* and 433*b*, respectively. In the embodiment of FIG. 11, the extensions 432 and 433*a/b* are embodied as rounded extensions, arranged in a wave-type pattern. The extensions 433*a/b* can be configured to arrange the shells 402*a* and 402*b* more compactly on the backing 404. As size is an important consideration for users, reducing the size of the utility carrier 400 is highly desirable. In the embodiment of FIG. 11, the first end 401*b* of the second shell 402*b* is neighboring the second end 403*a* of the first shell 402*a*. The extensions 433*a* of first shell 402*a*, that neighbor second shell 402*b*, are interdigitated with extensions 433*b* of second shell 402*b*, where the extensions 433*a* and 433*b* are in an alternating pattern.

Figure 14:
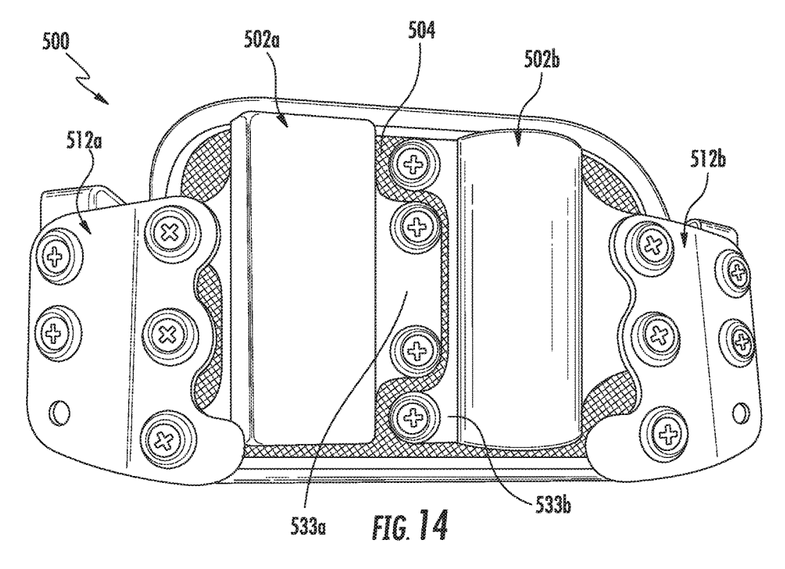
FIG. 14 shows a front view of another embodiment of a utility carrier device.

FIG. 14 shows a front view of yet another embodiment of a utility carrier device 500, where shell 502*a* and shell 502*b* are different shapes. For example, shell 502*a* may be configured for a mobile phone and shell 502*b* may be configured for a flashlight. The shells 502*a* and 502*b* are positioned vertically on backing 504 rather than angled as in the embodiment of FIG. 11, demonstrating that the angle may be customized to facilitate access to the secured items for a particular usage situation (e.g. different access angles for a utility carrier device attached to a user's waist versus an ankle). Device 500 also illustrates another embodiment of the shell extensions, where extension 533*a* of first shell 502*a* is elongated and sits between two extensions 533*b* that are at the top and bottom ends of second shell 502*b*. Thus, the extensions 533*a* and 533*b* are still interdigitated to reduce the lateral spacing of the shells 502*a* and 502*b* on the utility carrier device 500, but are extensions of different shapes than in FIG. 11.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. The scope of the following claims may include other implementations or embodiments.

What is claimed is:

1. A utility carrier device comprising:
    a first shell that is shaped to cover a part of a first item to be secured;
    a backing that is secured to the first shell thereby forming a first pocket between the first shell and the backing, the first pocket being configured to secure the first item to the utility carrier device;
    a first wing attached to and extending from a first end of the first shell;
    a first spacer positioned between the first wing and the first end of the first shell, the first spacer comprising a flexible or a compressible material that allows the first wing to flex relative to the first shell; and
    a backing spacer positioned between the first shell and the backing, the backing spacer comprising a compressible material that allows a dimension of the first pocket to be adjusted.

2. The utility carrier device of claim 1, further comprising a second wing attached to and extending from a second end of the first shell, with the first end and the second end being on opposite sides of the first shell.

3. The utility carrier device of claim 1, further comprising an attachment feature configured to secure the first shell to the backing;
    wherein the dimension of the first pocket is a depth; and
    wherein the attachment feature is configured to adjustably compress the backing spacer, thereby adjusting the depth of the first pocket.

4. The utility carrier device of claim 1, further comprising:
a second shell that is shaped to cover a part of a second item to be secured, the second shell being secured to the backing thereby forming a second pocket between the second shell and the backing, the second pocket being configured to secure the second item to the utility carrier device, wherein the second shell has a first end and a second end opposite the first end, the first end of the second shell neighboring the second end of the first shell;
a second wing attached to and extending from the second end of the second shell; and
a second spacer positioned between the second wing and the second end of the second shell, the second spacer comprising a flexible or a compressible material that allows the second wing to flex relative to the second shell.

5. The utility carrier device of claim 4, wherein the second end of the first shell and the first end of the second shell each comprise extensions, wherein an extension of the first shell is interdigitated with an extension of the second shell.

6. The utility carrier device of claim 1, wherein the first item is one of the group consisting of: an ammunition magazine, a flashlight, a set of handcuffs, a phone, and a radio.

7. The utility carrier device of claim 1, wherein the first shell comprises a rigid material.

8. The utility carrier device of claim 1, wherein the first wing comprises a rigid material.

9. The utility carrier device of claim 1, further comprising a holster attachment feature configured to secure the utility carrier device to at least one of a body part of a user and an article of clothing.

10. The utility carrier device of claim 9, wherein the holster attachment feature is releasably secured to the first wing such that a position of the holster attachment feature relative to the first wing is adjustable.

11. The utility carrier device of claim 9, wherein the holster attachment feature comprises at least one of a clip and a closed loop.

12. The utility carrier device of claim 1, wherein the backing comprises at least one of a padded material and a breathable material.

13. A utility carrier device comprising:
a first shell that is shaped to cover a part of a first item to be secured;
a backing that is secured to the first shell thereby forming a first pocket between the first shell and the backing, the first pocket being configured to secure the first item to the utility carrier device;
a first wing attached to and extending from a first end of the first shell, a height of the first wing being at least two-thirds a height of the shell; and
a first spacer positioned between the first wing and the first end of the first shell, the first spacer comprising a flexible or a compressible material that allows the first wing to flex relative to the first shell.

14. The utility carrier device of claim 13, wherein the first wing comprises a rigid material.

15. The utility carrier device of claim 13, further comprising a second wing attached to and extending from a second end of the first shell, with the first end and the second end being on opposite sides of the first shell.

16. The utility carrier device of claim 15, wherein the second wing comprises a rigid material.

17. The utility carrier device of claim 13, wherein the first item is one of the group consisting of: an ammunition magazine, a flashlight, a set of handcuffs, a phone, and a radio.

18. The utility carrier device of claim 13, further comprising:
a second shell that is shaped to cover a part of a second item to be secured, the second shell being secured to the backing thereby forming a second pocket between the second shell and the backing, the second pocket being configured to secure the second item to the utility carrier device, wherein the second shell has a first end and a second end opposite the first end, the first end of the second shell neighboring the second end of the first shell;
a second wing attached to and extending from the second end of the second shell; and
a second spacer positioned between the second wing and the second end of the second shell, the second spacer comprising a flexible or a compressible material that allows the second wing to flex relative to the second shell.

19. The utility carrier device of claim 18, wherein the second end of the first shell and the first end of the second shell each comprise extensions, wherein an extension of the first shell is interdigitated with an extension of the second shell.

* * * * *